United States Patent [19]
Hagiz

[11] 3,818,270
[45] June 18, 1974

[54] OVERLOAD INTERRUPT SYSTEMS FOR THREE-PHASE INDUCTION MOTOR

[76] Inventor: Gil Hagiz, 8 Weizman St., Ramat Hasharon, Israel

[22] Filed: Dec. 11, 1972

[21] Appl. No.: 313,856

[52] U.S. Cl. .............................. 317/13 R, 317/27 R
[51] Int. Cl. ............................................. H02h 7/08
[58] Field of Search .............. 317/13 R, 27 R, 33 R

[56] References Cited
UNITED STATES PATENTS

| | | | |
|---|---|---|---|
| 2,722,648 | 11/1955 | Dunigan | 317/13 R |
| 3,465,206 | 9/1969 | Harker et al. | 317/13 R |

*Primary Examiner*—James D. Trammell
*Attorney, Agent, or Firm*—Benjamin J. Barish

[57] ABSTRACT

An overload interrupt system for three-phase induction motors comprises first means generating a first voltage which is proportional to and in phase with the motor current flowing through a first phase of a power supply to the induction motor, second means generating a second voltage in phase with a voltage between the other two phases of the power supply and of the same order of magnitude of the first voltage under no-load conditions of the motor. A circuit vectorially subtracting the second voltage from the first voltage to produce a resulting voltage which is approximately proportional to the energy component of the motor current, a switching device controlled by the resultant voltage and a circuit interrupter controlled by the switching device to disconnect the electric motor from the power source.

7 Claims, 7 Drawing Figures

OVERLOAD INTERRUPT SYSTEMS FOR THREE-PHASE INDUCTION MOTOR

BACKGROUND OF THE INVENTION

The present invention relates to overload interrupt systems for three-phase induction motors, and particularly to such systems which are designed especially for protecting the mechanical devices driven by the motor rather than for protecting the motor itself.

A number of such overload interrupt systems are known. One type includes a wattmeter which measures the total power consumed by the electric motor and interrupts the power supply when that power exceeds a predetermined maximum. Such a system, however, is relatively slow-acting, requiring about 0.5 – 1.0 seconds to interrupt the power supply after the overload is detected. Accordingly, while such a system may be satisfactory to protect the motor from overload, it is not always sufficiently fast-acting to protect a mechanical device which may be driven by the motor, where it may be essential to quickly stop the motor in event of a mechanical jam to prevent damage to a device driven by the motor.

Another type of overload interrupt system includes switches which sense the mechanical movement of the motor or of its coupling to the driven device upon overload of the motor or jamming of the mechanical device driven thereby. Such overload interrupt systems, however, require a special displaceable mounting for the motor; moreover, they are not exact as a general rule, and also are difficult to adjust.

BRIEF SUMMARY OF THE INVENTION

The present invention provides an overload interrupt system for three-phase induction motors having advantages in one or more of the above respects.

According to a broad aspect of the invention, there is provided an overload interrupt system for three-phase induction motors supplied from a three-phase power source, comprising, first means generating a first voltage which is proportional to and in phase with the motor current flowing through a first phase of the power supply to the induction motor, second means generating a second voltage in phase with the voltage between the other two phases of the power supply and of the same order of magnitude as said first voltage under no-load conditions of the motor, a circuit vectorially subtracting said second from said first voltage to produce a resultant voltage, the latter being approximately proportional to the energy component of the motor current, a switching device controlled by said resultant voltage, and a circuit interrupter controlled by said switching device to disconnect the electric motor from the power source.

It will be seen that the second voltage, which is in phase with the voltage between the other two phases of the power supply, will be 90° out of phase with respect to the voltage of the first phase. Therefore, when that second voltage is subtracted from the first voltage, this in effect subtracts the quadrature current (i.e., the wattless, or non-energy component) from the motor load current. Accordingly, the resultant voltage produced is approximately proportional to the energy component of the load current. This component approximates the torque produced by the motor, and therefore when this torque suddenly increases, as for example by a mechanical jam, the resultant voltage which is generated is effective to quickly interrupt the motor supply.

Such an overload interrupt system is very fast-acting, accurate and easily presettable so as to be actuated at any desired load condition.

Further features of the invention will be apparent from the description below.

BRIEF DESCRIPTION OF THE DRAWINGS

The invention is herein described, somewhat diagrammatically and by way of example only, with reference to the accompanying drawings, wherein.

DESCRIPTION OF THE PREFERRED EMBODIMENTS

Figure 1:
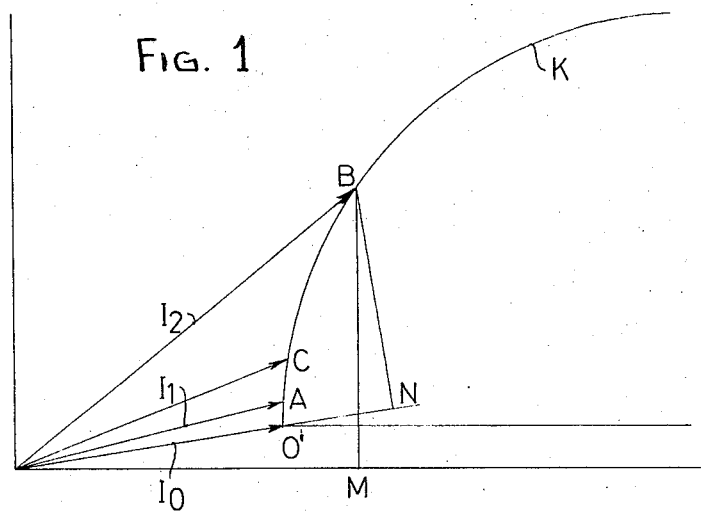
FIG. 1 is a part of a conventional circle diagram for an induction motor which will be helpful in explaining the invention.

With reference to FIG. 1 illustrating a conventional circle diagram for an induction motor, the vector $I_0$ terminating at point $0'$ represents the total no-load current with the rotor operating synchronously, i.e., there being no slip; vector $I_1$ terminating at point A represents the total current at no-load but with slip of the rotor; and the vector $I_2$ terminating at point B represents the total current at full load. As is known, changes in the load will cause the motor current $I_2$ to trace the circular arc K containing points $0'$, A, B.

Because of the substantial magnitude of the $I_0$ vector, changes in load, particularly from the no-load point A to the half-load point C on arc K, will result in small changes in the length of the current vector I. Accordingly, an overload system which senses this vector alone is not always sufficiently sensitive and fast-acting to a sudden increase in the load to protect mechanical devices driven by the motor.

The new overload interrupt system of the present invention is based on producing a voltage which is approximately proportional to the energy component of the load current (line BM for full load in the diagram of FIG. 1), and using that voltage for actuating the circuit interrupter. The energy component of the load current (line BM) is approximately proportional to the torque of the motor (line BN), and therefore any sudden increase in the torque will be sensed and used to actuate the circuit interrupter.

Briefly, in the overload interrupt system of the present invention, means are provided for generating a first voltage which is proportional to and in phase with the motor current flowing through a first phase of the power supply to the induction motor, and further means are provided for generating a second voltage in phase with the voltage between the other two phases of the power supply. The system further includes means for vectorially subtracting the second voltage from the first voltage to produce a resultant voltage which is approximately proportional to the energy component of the motor current. It is that voltage which is used to actuate the interrupter.

Figure 2:
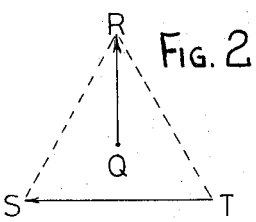
FIG. 2 is a diagram illustrating the voltage vectors in a three-phase power supply system.
Figure 3:
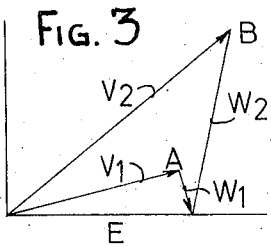
FIG. 3 is a vector diagram illustrating the principles of the invention.

The diagram of FIGS. 2 and 3 illustrate how this resultant voltage is produced.

FIG. 2 illustrates the phase diagram of a three-phase power supply, vector QR representing the voltage of one phase, and vector TS representing the voltage across the other two phases, which voltage is displaced 90° with respect to the voltage vector QR.

In the diagram of FIG. 3, the voltages $V_1$, $V_2$ represent the first of the above-mentioned generated voltages, namely the one proportional to and in phase with the motor current flowing through a first phase of the power supply to the induction motor, voltage $V_1$ representing the no-load voltage corresponding to current $I_1$ in FIG. 1, and voltage $V_2$ representing the full-load voltage corresponding to current $I_2$ in the diagram of FIG. 1. Vector E represents the second generated voltage which is in phase with the voltage between the other two phases of the power supply, namely voltage vector ST in FIG. 2. In the embodiment of the invention described below, this second voltage is fixed and is of the same order of magnitude as voltage $V_1$, namely the first mentioned voltage under no-load conditions.

Now if the second voltage (E) is subtracted from the first voltage ($V_1$, $V_2$), the resultant voltage ($W_1$, $W_2$) will be a vector approximately proportional to the energy component of the motor current. That is to say, it will be approximately vertical, but it will actually deviate from the vertical in one or the other direction as the motor load increases from no-load (point A) to full-load (point B). The magnitude of this vector ($W_1$, $W_2$) will change at a greater rate than the change in the motor current (I) as the load increases from no-load to full-load, and will therefore provide a more sensitive and faster-acting signal for controlling the overload interrupt system.

Figure 4:
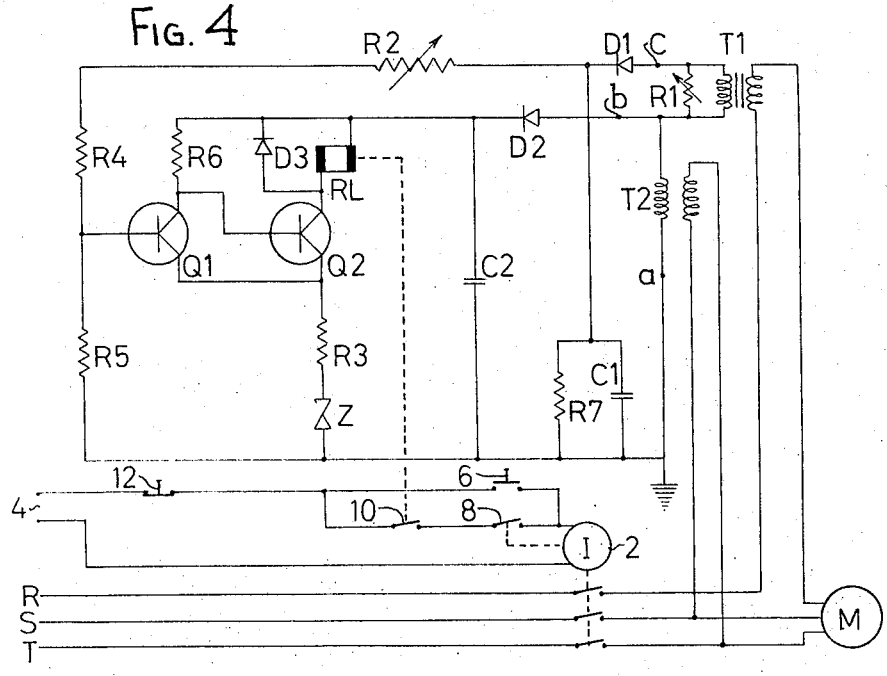
FIG. 4 is a circuit diagram illustrating one preferred embodiment of the invention.

FIG. 4 is a circuit diagram of one form of overload interrupt system constructed in accordance with the invention.

In FIG. 4, motor M is a three-phase induction motor supplied from a power source having the three phases R,S,T. The line between the power supply and the motor includes a circuit interrupter 2 supplied from a power source generally designated 4. The circuit to interrupter 2 includes a start switch 6 for energizing the interrupter 2, the latter including a holding switch 8 which is closed when the interrupter is energized. The circuit further includes another switch 10 (contacts of relay RL) in the energization circuit of interrupter 2, switch 10 being controlled by the overload interrupt system for disconnecting the motor from the power supply when an overload is detected. Further, a manual stop switch 12 is provided in the energization circuit of interrupter 2.

Relay RL whose contacts 10 control interrupter 2 is in the overload detection system. This relay is energized under normal operating conditions, whereupon its contacts 10 are closed, and is de-energized as soon as a predetermined overload condition is detected, whereupon its contacts 10 are opened to de-energize interrupter 2 and disconnect the motor from the power supply R, S, T.

The overload detection system includes a current transformer $T_1$ having a primary winding connected in series with phase R of the power supply, whereby a voltage is generated in the secondary winding of the transformer $T_1$ proportional to and in phase with the motor current flowing through phase R of the power supply to the induction motor. A calibrating resister $R_1$ is connected across the secondary winding of transformer $T_1$. One end of the resister (point C) is coupled through rectifier $D_1$ and adjustable load resister $R_2$ to the input of a Schmitt trigger, comprising transistors $Q_1$ and $Q_2$. The other end of resister $R_1$ is connected to point b.

A second transformer $T_2$ has its primary winding connected across the remaining two phases of the power supply, i.e., phases S and T. Transformer $T_2$ is used for two purposes: to supply power through rectifier $D_2$ to the Schmitt trigger; and to provide the fixed voltage (E. FIG. 3) to be vectorially subtracted from the voltage across resister $R_1$. One end (point a) of the secondary winding of transformer $T_2$ is connected to ground, and the other end (point b) is coupled by rectifier $D_2$ to the collectors of the Schmitt trigger transistor $Q_1$, $Q_2$. Relay RL whose contacts 10 control the circuit interrupter 2 is in the circuit of the collector of transistor $Q_2$.

The Schmitt trigger is of a conventional type in that the transistor emitters are connected together and to a common emitter resister $R_3$. The latter, however, is connected to the ground reference potential through a zener diode which provides a constant bias voltage of about 7 volts. The bias provided by zener diode Z, together with that provided by resisters $R_4$, $R_5$ are such that resister $R_2$ would be "0" for a no-load condition of the motor; that is, the adjustment of resister $R_2$ for the load condition to actuate the Schmitt trigger would start from "0."

The Schmitt trigger further includes base biasing resisters $R_4$, $R_5$; collector resister $R_6$; and a diode $D_3$ in shunt with relay RL for protecting transistor $Q_2$ against surges.

The rectified input from transformer $T_1$ is filtered by capacitor $C_1$ and resister $R_7$ connected between rectifier $D_1$ and ground; and the rectified input from transformer $T_2$ is filtered by capacitor $C_2$ connected between rectifier $D_2$ and ground.

It will be seen that the voltage between points b and c will be proportional to and in phase with the motor current flowing through phase R of the power supply to the induction motor. Thus, this voltage corresponds to voltage $V_1$, $V_2$ of the diagram of FIG. 3. Further, the voltage between points a, b is proportional to and in phase with the voltage between the other two phases, (phases S, T) of the power supply, and thus would correspond to vector E, FIG. 3. Calibrating resister $R_1$ is used to adjust the voltage between points b, c, so as to be approximately equal, at no load, to the voltage between points a, b. For example, the voltage between points a, b (vector E, FIG. 3) may be about 24 volts, whereupon calibrating resister $R_1$ would be adjusted at no load to provide about 24 volts (vector $V_1$, FIG. 3) between points b, c, which would thereby provide a minimum magnitude of $W_1$, FIG. 3. Resister $R_2$ would then be adjusted to provide the predetermined voltage, representing the predetermined load condition, for actuating the Schmitt trigger and relay RL.

While the motor is operating under normal conditions, relay RL is energized and therefore its contacts 10 are closed. As soon as an overload condition is detected, as pre-set by the adjustment of resistor $R_2$, the resultant voltage ($W_2$, FIG. 3) produced by subtracting the voltage between points $a$, $b$ from points $b$, $c$ in the manner described above, will be sufficient to actuate the Schmitt trigger $Q_1$, $Q_2$ so as to interrupt the energization of relay RL, whereupon its contacts 10 will open. When this occurs, circuit interrupter 2 is de-energized, thereby opening the circuit from the power supply system to the motor.

The system of FIG. 4 has been described for interrupting the circuit when the load exceeds a predetermined maximum. It will be appreciated, however, that the same system could be used for interrupting an electric motor when the load current drops below a predetermined minimum, for example in a system wherein a plurality of motors are driving a load device, which drive is to be terminated should the load of any one of the motors drop below a predetermined minimum.

While a Schmitt trigger has been disclosed, other switching devices could be used, for example a simple unijunction transistor.

The system may also include a bridge rectifier having four diodes, in place of the single diode D1, for providing full-wave rectification of the signal rather than half-wave. This permits the size of capacitor C1 to be reduced, thereby obtaining faster response time.

In addition, current transformer T1 may be designed to saturate at twice the rated current of the motor, thereby reducing starting surges.

Figure 5:
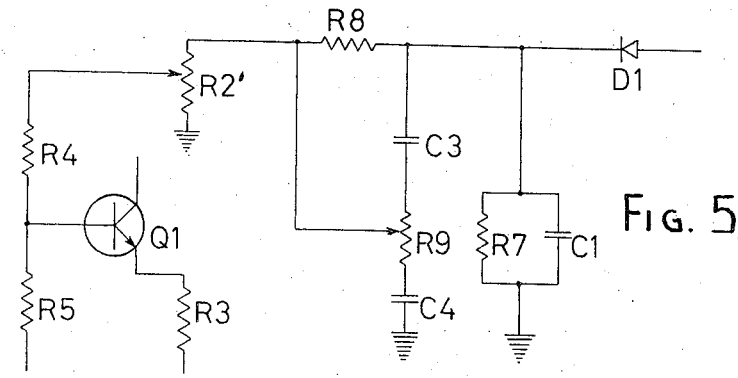
FIG. 5 illustrates a network that could be included in the input to the amplifier for varying the sensitivity of the system to rapid changes in load.

Further, a network such as shown in FIG. 5 may be provided to vary the sensitivity of the system to rapid changes in load. This network, including capacitors C3, C4, resistor R8, and variable resister R9, is coupled between diode D1 and resistor R2 of FIG. 4 (resister R2' of FIG. 5). Such a network is similar to a treble control commonly used in an audio amplifier and operates to vary the amplification of the amplifier with respect to frequency. In this case, the sensitivity of the system is increased with respect to changes in load by increasing the value of resister R9' (by raising its variable tap) in shunt with resister R2' input to transistor amplifier Q1.

Figure 6:
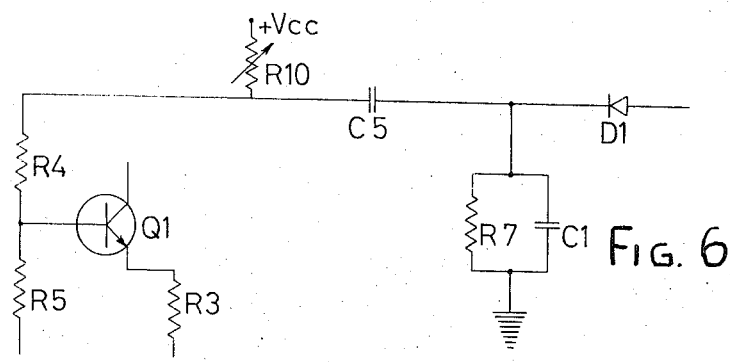
FIG. 6 illustrates the inclusion of a differentiating network in the input to the amplifier to make the system sensitive to rate of change of load.

The system may also be made to be sensitive only to rate of change of load. This is illustrated in FIG. 6, wherein a differentiating network including capacitor C5 and variable resister R10 is coupled between diode D1 and the input to transistor amplifier Q1.

In the system described above, protection during actual starting of the motor may be incomplete because depression of the start button 6 produces a surge which will cause transistor Q1 to conduct. Thus, at the instant of starting, transistor Q2 and relay RL may be non-conducting, and the latter's contacts may be open. For this reason, the start button 6 should be held depressed until this surge passes, which means that the system is not under the protection during this time. Accordingly, should an overload condition be encountered at the instant of starting, for example by the driven device being jammed, the protective system may not act sufficiently fast to protect the jammed device.

Figure 7:
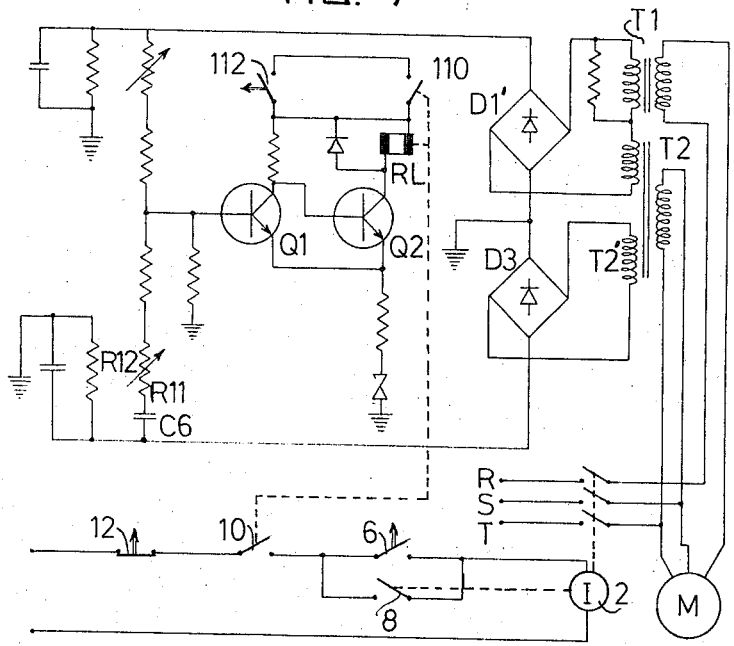
FIG. 7 illustrates a further modification in the circuit to provide protection during starting.

FIG. 7 illustrates a variation in the system for providing protection during starting. This protection is obtained by providing the switching device, namely transistor Q1, with a separate source of voltage to compensate for the voltage applied thereto by starting surges. Thus, the separate voltage is applied to the base of transistor Q1 from a secondary winding T2' of transformer T2, via a bridge rectifier D3, and variable resister R11. This voltage is applied through a differentiating network comprising capacitor C6 and resistor R12, so that the base of transistor Q1 is subjected to this additional voltage only during starting, or other conditions liable to produce the above-mentioned surge.

The circuit of FIG. 7 further includes a separate voltage supply Vcc for transistors Q1, Q2 and relay RL. This voltage supply circuit includes another set of contacts 110 operated by relay RL, and also a reset switch 112 for resetting the system.

What is claimed is:

1. An overload interrupt system for three-phase induction motors supplied from a three-phase power source, comprising:

first means including first transformer means for deriving a first voltage from a first phase of said power source which is proportional to and in phase with the motor current flowing through a first phase of the power source to the induction motor;

second means including second transformer means for deriving a second voltage from second and third phases of said power source, said second voltage being representative of the voltage between said second and third phases of the power source, and being of generally constant magnitude;

said first means including means for adjusting said first voltage to be substantially equal to said second voltage under no-load conditions;

a circuit vectorially subtracting said second voltage from said first voltage to produce a resultant voltage, the latter being approximately proportional to the energy component of the motor current;

a circuit interrupter operative to disconnect the electric motor from the power source;

a solid state switching device operative in response to said resultant voltage to provide activation of said circuit interrupter for disconnecting the electric motor from the power source at an adjustable level of said resultant voltage;

a means for adjusting the level of said resultant voltage at which said circuit interrupter is activated; and means responsive to starting surges for providing additional voltage to said switching device to compensate for the voltage applied thereto by starting surges, thereby providing protection during starting.

2. A system according to claim 1, wherein said switching device includes a Schmitt trigger having a common emitter resistor, and a Zener diode in series with the common emitter resister between same and the reference potential for the emitters.

3. A system according to claim 1, wherein said switching device includes an amplifier and a network coupled to the input of the amplifier for varying the amplitude of the input signal with respect to frequency, thereby varying the sensitivity of the system with respect to rapid changes in load.

4. A system according to claim 1, wherein said switching device includes an amplifier and a differentiating network coupled to the input of the amplifier to make the system sensitive to rate of change of load.

5. The overload interrupt system of claim 1 further including means responsive to said second voltage for providing operating power for said switching device and said circuit interrupter.

6. The overload interrupt system of claim 1 wherein said adjusting means further includes means having a zero setting representing a zero load condition and increasingly higher settings directly representing increasingly higher load conditions for activation of said circuit interrupter.

7. The overload interrupt system of claim 1, wherein said first transformer means saturates at a voltage level sufficiently low to reduce starting transients in said first voltage.

* * * * *